(12) United States Patent
Jones

(10) Patent No.: US 6,195,825 B1
(45) Date of Patent: Mar. 6, 2001

(54) LAUNDRY WASH-CYCLE WATER RECOVERY SYSTEM

(75) Inventor: Randall J. Jones, Phoenix, AZ (US)

(73) Assignee: Wastewater Resources Inc., Scottsdale, AZ (US)

( * ) Notice: Subject to any disclaimer, the term of this patent is extended or adjusted under 35 U.S.C. 154(b) by 0 days.

(21) Appl. No.: 09/057,280

(22) Filed: Apr. 8, 1998

Related U.S. Application Data

(63) Continuation-in-part of application No. 08/669,023, filed on Jun. 24, 1996, now abandoned.

(51) Int. Cl.[7] .................................................. D06F 39/10
(52) U.S. Cl. ................. 8/158; 68/18 F; 68/902; 210/650; 210/780; 210/791; 210/805; 210/388; 210/652
(58) Field of Search .................. 68/12.13, 13 R, 68/18 F, 902; 210/167, 194, 198.1, 388, 650, 780, 791, 797, 805, 652; 8/158

(56) References Cited

U.S. PATENT DOCUMENTS

| | | | |
|---|---|---|---|
| 4,441,340 | 4/1984 | Kaplan | 68/12 R |
| 5,207,922 | * 5/1993 | McFarlan et al. | 210/708 |
| 5,329,659 | * 7/1994 | Reinert | 210/806 |

* cited by examiner

*Primary Examiner*—Robert Popovics
(74) *Attorney, Agent, or Firm*—Antonio R. Durando

(57) ABSTRACT

A waste-water treatment and recycling process that reduce water, energy and chemical consumption in commercial laundry operations. A portion of the warm waste water from each wash cycle is first passed through a vibrating shaker screen to remove particles larger than 70 microns and then filtered through a 1–5 micron medium in a tubular filtration unit. The clear-water filtrate is then heated to operating temperature and recycled to the wash cycle of the process through the hot-water feed system. Only unheated fresh water is used for the rinse cycle, thereby also providing make-up water to the system. For operations requiring low total dissolved solids, a nanofiltration unit is added downstream of the tubular filtration unit.

20 Claims, 2 Drawing Sheets

LAUNDRY WASH-CYCLE WATER RECOVERY SYSTEM

RELATED APPLICATIONS

This application is a continuation-in-part of U.S. Ser. No. 08/669,023, filed on Jun. 24, 1996, by the same inventor and now abandoned.

BACKGROUND OF THE INVENTION

1. Field of the Invention

This invention pertains to the general field of water purification and recovery. In particular, it provides a new method and apparatus for the reclamation and reuse of waste-water effluent from wash cycle of laundry operations.

2. Description of the Prior Art

Normally, water usage results in its contamination and the resulting waste water is no longer useful for most applications. Therefore, waste waters from domestic and industrial users have been the subject of treatment and purification for a long time in order to remove toxic contaminants, bad odors and suspended solids. The waste water is typically treated by various means of filtration and chemical reaction designed to accomplish specific purification goals, as needed by particular users. The most common systems involve passing the water through layers of filtering media to remove solid particles and through chemically active media to reduce the water's hardness, improve its pH, and extract undesirable contaminants.

Accordingly, water purification agents are generally categorized in terms of their function as filters, when designed to eliminate larger size suspended solids; clarifiers, when intended to remove smaller size particles and reduce opacity; softeners, to remove calcium and magnesium ions and reduce water hardness; and refiners, to extract chlorine, iron and organic compounds. Both anion and cation exchange resins are used to perform a multiplicity of these functions.

The separation of solutes from water by means of selectively permeable membranes is also an effective and economical method of water purification. The processes of reverse osmosis, ultrafiltration, nanofiltration and electrodialysis all involve the use of membranes that have the ability to prevent the migration of most dissolved and suspended solids while allowing the passage of water through their pores.

This invention is directed to the use of a novel combination of these known methods of water purification in a new application for treating waste-water effluents from commercial laundries. In particular, it discloses a closed-loop system for reusing the hot waste-water effluent from the washing cycle of a laundry operation.

During conventional laundry operations, the waste water from each cycle is typically disposed of to the sewer after use and fresh water is fed to the washer machines through cold and hot feed systems to completely replace each load. The cold water feed is drawn directly from a utility supply, while the hot water feed is first heated and stored in a tank at about 150 to 180° F. As the washer machines process laundry, they call for both hot and cold water from these sources in order to provide the water utilized in the wash process. In most operations, the proportion of hot to cold water usage is about fifty/fifty. The resulting waste water is typically at 120° F. and laden with detergent and softening chemicals, in addition to dirt and pollutants. Therefore, when waste water is drained to a sewage system or otherwise discarded, useful chemicals and valuable heat are also wasted with it. In addition, the contaminants left in the water often require downstream water treatment before the effluent can be released to the environment.

Thus, conventional laundry operations involve large water usage, high fuel consumption for water heating, and wasteful disposal of active chemical ingredients in the waste-water effluent, all of which affect the efficiency and operating costs of a laundry.

Therefore, it would be very desirable to improve commercial laundry processes by minimizing these problems.

In U.S. Pat. No. 4,441,340 (1984), Kaplan discloses a system for recycling water from the rinse cycle of a commercial laundry. The water is combined with heated or fresh make-up water, as necessary to reach the required operating temperature, and is then used in the next wash cycle of the laundry system. By so doing, the invention also recovers the heat content present in the water after the rinse cycle is completed. Only rinse water is used because it is relatively clean and can, therefore, be reused as wash water maintaining the quality of washing during the second and subsequent cycles.

Since commercial laundries use relatively cold water for rinsing purposes, the heat recovery afforded by this invention is modest. In addition, no prior art system has been able to recycle wash water effectively and recover not only its energy content, but also its unused active chemicals. Thus, the purpose of this invention is to address this objective by reusing at least a portion of the hot waste water produced during the wash cycle of conventional laundry processes.

SUMMARY OF THE INVENTION

One of the objectives of this invention is the reduction of fuel consumption in the hot-water feed system of a commercial laundry operation.

Another objective of the invention is the reduction of water consumption in a commercial laundry operation.

Yet another objective is the reduction of waste water disposed to a sewage system from a commercial laundry operation.

Another goal of the invention is the full utilization of the active chemicals in laundry water for the purposes of the laundering operation before it is discarded as waste water.

Still another goal is the reduction of chemicals and other pollutants released to the environment from commercial laundry operations.

A final objective is the easy and economical implementation of the process of the invention according to the above stated criteria. This is achieved by using commercially available apparatus, materials and processes, modified only to the extent necessary to fit the requirements of the invention.

Therefore, according to these and other objectives, the present invention consists of a waste-water treatment and recycling process for reducing water, energy and chemical consumption in commercial laundry operations. A portion of the warm waste water from each wash cycle is first passed through a vibrating shaker screen to remove particles larger than 70 microns and then filtered through a 1–5 micron medium in a tubular filtration unit. The clear-water filtrate is then heated to operating temperature and recycled to the wash cycle of the process through the hot-water feed system. Only unheated fresh water is used for the rinse cycle, which also provides the water make-up for the process. For operations requiring low total dissolved solids, a nanofiltration unit is added downstream of the tubular filtration unit.

Various other purposes and advantages of this invention will become clear from its description in the specifications that follow, and from the novel features particularly pointed out in the appended claims. Therefore, to the accomplishment of the objectives described above, this invention consists of the features hereinafter illustrated in the drawing and examples, fully described in the detailed description of the preferred embodiment and particularly pointed out in the claims. However, such drawing and description disclose but one of the various ways in which the invention may be practiced.

DETAILED DESCRIPTION OF THE INVENTION

Figure 1:
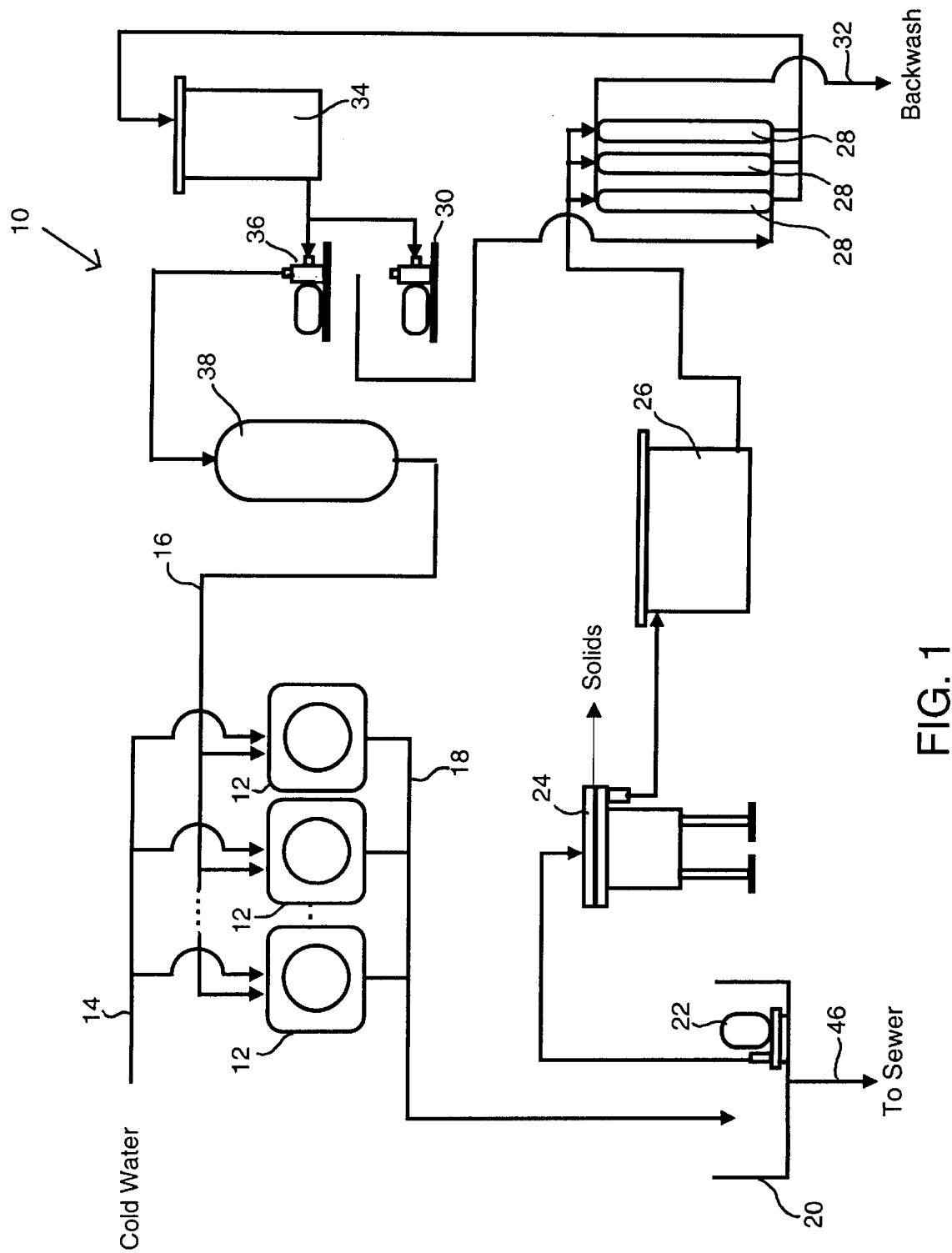
FIG. 1 illustrates a schematic diagram of a laundry operation in accordance with the present invention.

The novelty of this invention lies in the fact that the waste water from the wash cycle of a laundry operation is reused in the process, thereby producing savings in energy, water and chemical consumption. Referring to FIG. 1, a schematic representation of a laundry system 10 according to the invention is illustrated. At least one conventional washer 12 (typical commercial operations utilize 3 to 10 machines operating in parallel) is shown hooked up to a cold-water feed line 14 and a hot-water feed line 16, such that the two water feeds may be used to provide water to the washers 12 as needed to achieve the desired operating temperatures during all cycles of the washing process. Typical wash operating temperatures of commercial laundry operations are 155 to 180° F. According to the preferred embodiment of the invention, the hot water feed is used only for washing and the cold water feed only for rinsing from the respective feed lines 14,16. Therefore, the hot water feed is heated to the laundry's operating wash-cycle temperature. In addition, some laundry operations utilize soft water, in which case the cold-water feed line 14 is also passed through water-softening apparatus (not shown in the figure) prior to delivery to the washers 12.

According to standard procedure in commercial laundry operations, the waste water effluent from the washers 12 is dumped in a trench 18 in the laundry floor and then collected in a floor sump 20. Typically, the mixed waste water collected in the sump 20 from both wash and rinse cycles has an approximate temperature of 120° F.; therefore, its heat content is wasted when the water is disposed of through the sewer system. According to the present invention, a portion of this waste water is transferred by a sump pump 22 to a shaker screen 24 where lint and other solids larger than about 75 microns are separated from the waste water and discarded. Shaker screens are preferred for this operation because of their reliability and proven effectiveness for the removal of oversize material suspended in water.

The warm filtered water from the shaker screen 24 is collected in a holding tank 26 to provide flow equalization to the downstream phases of the process. This tank is necessary because of the use of multiple machines and their cyclical operation which produce waste water intermittently.

In a separate step in the wash-water recycling process of the invention, the water from the holding tank 26 is continuously fed through filtration apparatus to remove particles greater than approximately 3 microns (filters sizes in the 1–5 micron range are typically used). Preferred for this step is a battery of tubular membrane filters 28 operated in parallel at about 50 to 80 psi. Each filter is self cleaning by means of backwash flow sustained by a backwash pump 30 operated periodically to purge the filters 28 of any entrapped residue to a drain line 32. Appropriate valves (not shown in the drawings) permit the switching of the flow in each filter 28 from the filtering to the backwash mode. Thus, by backwashing alternative filters at different times, the continuous operation of the system can be maintained.

The clean effluent from the filters 28 is collected in a hot water storage tank 34 for recycling and further use in the washing operation of the washers 12. Typically, the temperature of the clean water collected in tank 34 is only about 2° F. colder than its temperature in the sump 20, thereby retaining most of the heat content available upon discharge from the washers 12. As needed, the cleaned water is transferred by a hot-water recycle pump 36 to a water heater 38 where it is heated to normal hot-water feed temperature, which is dependent on the operating temperature desired for the wash cycle. Under typical conditions, the recycle water is heated to about 120 to 180° F. Then, the hot recycle water is drawn from the heater 38 on demand and pumped through line 16 to the washers 12 for the wash cycle, thereby completing the recycling loop. It is noted that only hot recycled water is used for the wash cycle in the preferred embodiment of the invention. The cold water feed, which is typically between 50 and 65° F., is preferably used only during rinsing cycles. Obviously, hot and cold water could be mixed as desired to meet different operating requirements and the hot water temperature in heater 38 would have to be adjusted accordingly.

Figure 2:
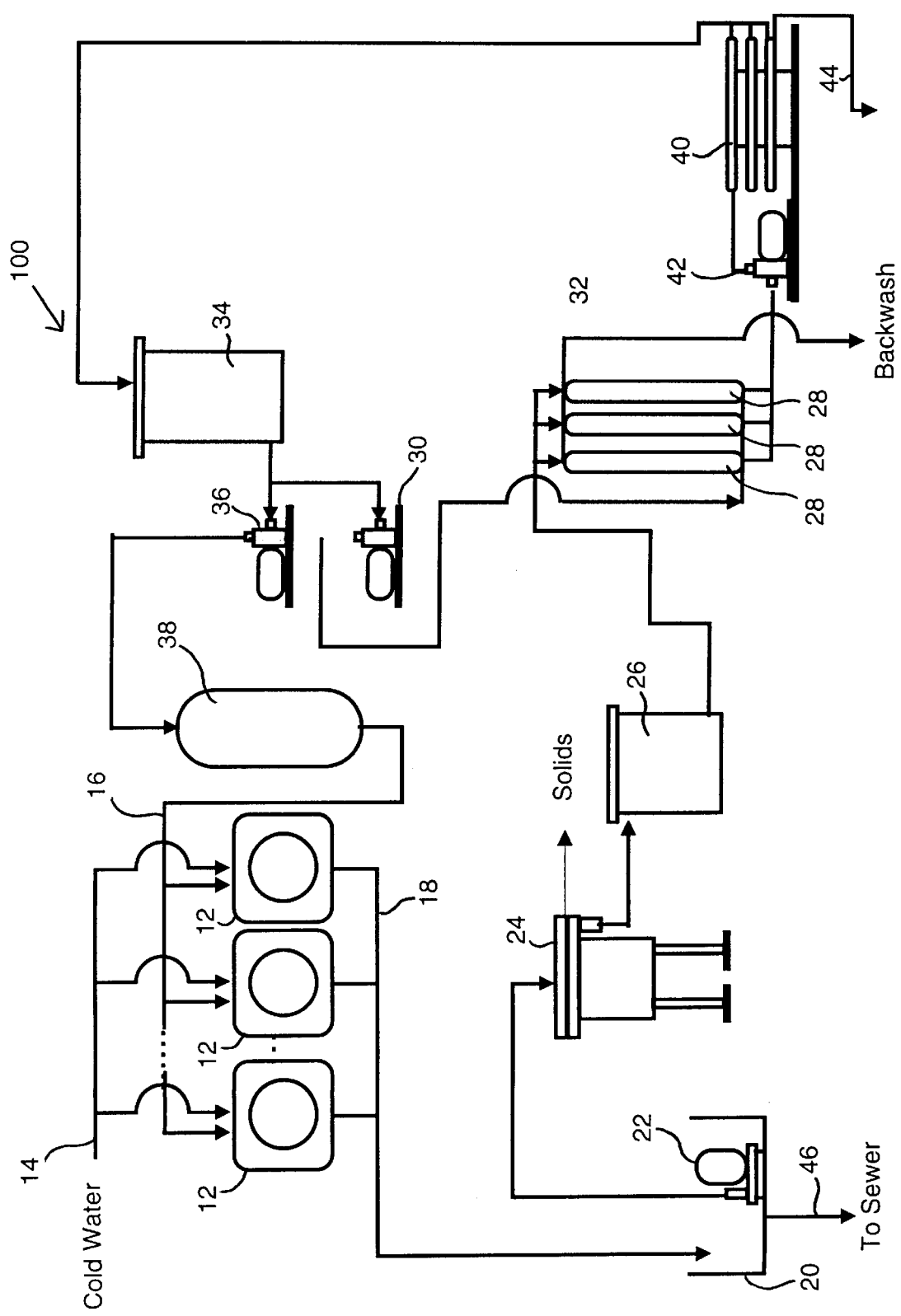
FIG. 2 is a schematic diagram of a laundry operation in accordance with another embodiment of the present invention that includes nanofiltration.

In another embodiment 100 of the invention that is preferred for those laundry operations that have low-total-dissolved solids (TDS) requirements, a secondary filtration step is used to remove a large part of the dissolved solids and organic components. As illustrated in FIG. 2, a nanofiltration unit 40 is included in the process prior to storage of the clean water in tank 34. Because of the higher operating pressure required for nanofiltration (approximately 150 psi), a secondary pump 42 is utilized to pass the clean water effluent from the tubular membrane filters 28 through the membranes in the nanofiltration unit 40. The resulting high quality water is stored in tank 34 and recycled to the system as described above. The nanofiltration reject is disposed to a sewer through a line 44.

The process of nanofiltration has evolved from experimental work performed to improve the performance of reverse osmosis and of ultrafiltration. The term "nano," which refers to a one billionth part, was adopted for this type of filtration because of the size of the pores of the membranes used. Operating at pressures ranging from 75 to 250 psi, these membranes remove particles sizes in the order of angstroms with rejection rates greater than 95 percent under most conditions. The membranes are available in several chemical compositions with different characteristics for specific applications. Moreover, they can be combined with larger pore membranes (ultrafiltration) and with reverse osmosis membranes to meet the specific requirements of particular waters. Therefore, the process of the invention could be further modified to include ultrafiltration and reverse-osmosis apparatus if required to meet particular water-quality requirements.

It is noted that the laundry process of the invention does not utilize any hot water other than what is available from the recycling operation. To the extent that this water contains active laundry chemicals and a heat content higher than that of fresh water, it is ideal for hot-water feed supply to the operation. Also, if the water had been softened prior to introduction to the system, its softness would be in large part retained, further reducing operating costs. Therefore, the laundry utilizes fresh water only for the cold supply to the washing machines during the rinse cycle.

Experience has shown that all particles with nominal diameter of 5 microns or larger must be removed from the recycled stream in order to avoid plugging of the heater coils, damage to valves, and overall redeposition of the reheated particles within the system and on the clothes. Therefore, the disclosed filtration equipment or equivalent apparatus is essential to the continuous operation of the laundry system of the invention.

The net effect of the process of the invention is to lower overall water consumption (i.e, water drawn from the feed system and waste water discarded into the sewage system) by as much as 59 percent. In addition, heating costs are reduced by as much as 70 percent and chemical costs by 10–20 percent. Therefore, the concept of the invention is cost effective as well as environmentally sound and desirable because it reduces consumption of valuable resources (water, energy and chemicals) and decreases the need for disposal of the resulting waste byproducts.

The performance of the process according to this invention is illustrated by the two examples reported below representing different operating conditions. Both examples deal with the same type of apparatus in commercial laundry operations.

Specifically, the sump pump 22 used in both examples had a capacity of 100 gallons per minute at 300 inch total discharge head. The shaker screen 24 consisted of a separator sold by the SWECO Company of Florence, Ky., under the registered trademark VIBRO-ENERGY, Model XS48S88. The tubular membrane filtration system consisted of a battery of filters sold by Duriron Company Inc. of Angola, N.Y., as Model TE3 fitted with 5-micron sleeves. The secondary pump 42 had sufficient capacity to feed the nanofiltration system, which operated at an average pressure of 150 psi. The nanofiltration system was designed to operate at about 85 percent recovery at pressures of approximately 150 psi with membranes of 1–2 angstroms minimum pore size. Finally, the hot-water recycle pump 30 and the backwash pump were conventional 2–3 hp centrifugal pumps.

EXAMPLE 1

Operating Conditions

Washer operating temperature: 160° F.
Cold-water feed temperature: 58° F.
Hot-water feed temperature: 160° F.
Sump waste water temperature: 115° F.
Ratio of cold to hot water usage: 50/50.

Operating Savings Produced by Invention

Water usage: 50%.
Energy consumption: 53%.
Chemicals consumption: 15%.

EXAMPLE 2

Operating Conditions

Washer operating temperature: 140° F.
Cold-water feed temperature: 62° F.
Hot-water feed temperature: 140° F.
Sump waste water temperature: 106° F.
Ratio of cold to hot water usage: 50/50.

Operating Savings Produced by Invention

Water usage: 50%.
Energy consumption: 51%.
Chemicals consumption: 15%.

As illustrated, the process and apparatus of the invention provide a valuable means for reducing operating costs of commercial laundry operations. Moreover, the invention is compatible with environmentally sound and desirable procedures.

It is noted that the fresh water fed to the system during rinse cycles through the cold-water feed line 14 provides the replacement water for continued operation. After each rinsing cycle, the cold water is mixed in the sump 20 with the warm water from the wash cycle and about 50% of the total water used is recycled through the system of the invention. The balance is either disposed of to the sewer system through line 46 or left as moisture in the laundry. Accordingly, there is continual renewal of the water used in the recycling process.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

I claim:

1. A process for reducing water, chemical and energy consumption in a laundry operation wherein waste water is produced in a common sump as a result of mixing all water from a wash cycle and all water from a rinse cycle of washing equipment operating at a predetermined operating wash temperature, comprising the following steps:

(a) processing at least a portion of said waste water to separate therefrom lint and suspended particles greater than a predetermined size and to produce a corresponding portion of processed water;

(b) heating said portion of processed water to a predetermined temperature;

(c) carrying out said wash cycle of the washing equipment utilizing said heated portion of processed water;

(d) discarding another portion of said waste water; and (e) making up substantially all of said discarded portion of waste water by providing unheated fresh water to the washing equipment during a rinsing cycle thereof.

2. The process of claim 1, wherein said step of processing at least a portion of said waste water to separate therefrom lint and suspended particles greater than a predetermined size and produce a corresponding portion of processed water comprises a step of filtration.

3. The process of claim 2, wherein said step of filtration is carried out by passing said portion of said waste water through at least one tubular filtration unit.

4. The process of claim 3, wherein said at least one tubular filtration unit comprises at least one tubular membrane filter capable of retaining particles larger than approximately 5 micron.

5. The process of claim 2, wherein said step of filtration is carried out by passing said portion of said waste water through a vibrating shaker screen and at least one tubular filtration unit.

6. The process of claim 5, wherein said vibrating shaker screen is capable of separating particles larger than about 75 microns and said at least one tubular filtration unit comprises at least one tubular membrane filter capable of retaining particles larger than approximately 5 micron.

7. The process of claim 2, wherein said step of filtration is carried out by passing said portion of said waste water through a vibrating shaker screen, at least one tubular filtration unit, and a nanofiltration unit.

8. The process of claim 7, wherein said vibrating shaker screen is capable of separating particles larger than about 75 microns, and said at least one tubular filtration unit comprises at least one tubular membrane filter capable of retaining particles larger than approximately 5 micron.

9. The process of claim 8, wherein said heated portion of processed water and said unheated fresh water are used in approximately a 50/50 ratio.

10. The process of claim 9, wherein said predetermined temperature is about 155–180° F.

11. The process of claim 1, wherein said heated portion of processed water and said unheated fresh water are used in approximately a 50/50 ratio.

12. A method of laundering comprising the following steps:
   (a) carrying out a wash cycle that produces a waste wash-water effluent;
   (b) carrying out a rinse cycle that produces a waste rinse-water effluent;
   (c) mixing all of said wash-water and said rinse-water effluents in a common sump and processing a first portion of a waste water resulting therefrom to remove all particles greater than about 5 microns;
   (d) discarding a second portion of said waste water;
   (e) heating said processed first portion of the waste water to a laundering operating temperature;
   (f) repeating step (a) utilizing heated waste water produced by step (e);
   (g) repeating step (b) utilizing unheated fresh water; and
   (h) continuing laundering by sequentially repeating steps (c) through (f).

13. The process of claim 12, wherein said step (c) comprises a step of filtration.

14. The process of claim 13, wherein said step of filtration is carried out by passing said first portion of a waste water through at least one tubular filtration unit.

15. The process of claim 14, wherein said at least one tubular filtration unit comprises at least one tubular membrane filter capable of retaining particles larger than approximately 5 micron.

16. The process of claim 13, wherein said step of filtration is carried out by passing said first portion of a waste water through a vibrating shaker screen and at least one tubular filtration unit.

17. The process of claim 16, wherein said vibrating shaker screen is capable of separating particles larger than about 75 microns and said at least one tubular filtration unit comprises at least one tubular membrane filter capable of retaining particles larger than approximately 5 micron.

18. The process of claim 13, wherein said step of filtration is carried out by passing said first portion of a waste water through a vibrating shaker screen, at least one tubular filtration unit, and a nanofiltration unit.

19. The process of claim 18, wherein said vibrating shaker screen is capable of separating particles larger than about 75 microns, and said at least one tubular filtration unit comprises at least one tubular membrane filter capable of retaining particles larger than approximately 5 micron.

20. The process of claim 13, wherein said heated waste water in step (f) and said unheated fresh water in step (g) are used in approximately a 50/50 ratio.

* * * * *